(12) United States Patent
Ono (10) Patent No.: US 11,558,516 B2
(45) Date of Patent: Jan. 17, 2023

(54) INFORMATION PROCESSING DEVICE FOR DETERMINING WHICH REGISTERED SETTINGS TO USE FOR AN IMAGE FORMING OPERATION

(71) Applicant: FUJIFILM BUSINESS INNOVATION CORP., Tokyo (JP)

(72) Inventor: Yuki Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/141,679

(22) Filed: Jan. 5, 2021

(65) Prior Publication Data
US 2022/0070317 A1   Mar. 3, 2022

(30) Foreign Application Priority Data

Aug. 28, 2020   (JP) .............................. JP2020-144943

(51) Int. Cl.
*H04N 1/00* (2006.01)
*H04N 1/32* (2006.01)

(52) U.S. Cl.
CPC ..... *H04N 1/00517* (2013.01); *H04N 1/00427* (2013.01); *H04N 1/00477* (2013.01); *H04N 1/00514* (2013.01); *H04N 1/32096* (2013.01); *H04N 1/32101* (2013.01)

(58) Field of Classification Search
CPC ........... H04N 1/00517; H04N 1/00514; H04N 1/00501
See application file for complete search history.

(56) References Cited

U.S. PATENT DOCUMENTS

| | | | |
|---|---|---|---|
| 2011/0199623 A1 | 8/2011 | Okuyama | |
| 2012/0307287 A1* | 12/2012 | Motosugi | G06K 15/00 358/1.14 |
| 2015/0109638 A1* | 4/2015 | Sasaki | H04N 1/00954 358/1.15 |
| 2016/0065766 A1* | 3/2016 | Miyamoto | H04N 1/00517 358/1.13 |
| 2017/0041475 A1* | 2/2017 | Won | H04N 1/32101 |
| 2017/0068494 A1* | 3/2017 | Fukuda | G06F 3/1273 |
| 2017/0293455 A1* | 10/2017 | Iwamoto | G06F 3/1205 |
| 2017/0315759 A1* | 11/2017 | Lin | G06F 3/1275 |
| 2019/0098142 A1* | 3/2019 | Ozawa | H04N 1/00092 |

FOREIGN PATENT DOCUMENTS

| | | |
|---|---|---|
| JP | 2011166781 A | 8/2011 |
| JP | 2014-219880 A | 11/2014 |

* cited by examiner

*Primary Examiner* — Benjamin O Dulaney
(74) *Attorney, Agent, or Firm* — Oliff PLC (57) ABSTRACT

An information processing device includes: a processor configured to: when (i) in addition to a first image forming device on which a user is about to use a service, a second image forming device on which the user used the service is present, the second image forming device being different from the first image forming device and (ii) a server in which basic settings of setting items of the service are registered is present, selectively reflect at least one of (a) setting items of the service registered in the second image forming device or (b) the basic settings of the service registered in the server, in the information processing device according to a predetermined condition.

17 Claims, 9 Drawing Sheets

BASIC SETTING DATABASE

| SERVICE | USER ID | BASIC SETTING | | | | UPDATE DATE AND TIME |
|---|---|---|---|---|---|---|
| | | TRANSMISSION DESTINATION | TRANSMISSION SOURCE | FORMAT | ... | |
| SCAN AND MAIL SERVICE | U0001 | xxx@xxx.com | aaa@aaa.com | HIGH COMPRESSION PDF | ... | 2020/8/7 19:20 |
| | U0002 | yyy@yyy.com | bbb@bbb.com | NORMAL COMPRESSION PDF | ... | 2020/8/6 14:15 |
| | ⋮ | ⋮ | ⋮ | ⋮ | ⋮ | ⋮ |
| | ⋮ | ⋮ | ⋮ | ⋮ | ⋮ | ⋮ |

FIG.5

HISTORY INFORMATION DATABASE

| USER ID | SERVICE | SETTING ITEM | | | | SETTING DATE AND TIME |
|---|---|---|---|---|---|---|
| | | TRANSMISSION DESTINATION | TRANSMISSION SOURCE | FORMAT | ... | |
| U0001 | SCAN AND MAIL SERVICE | xxx@xxx.com | aaa@aaa.com | HIGH COMPRESSION PDF | ... | 2020/8/8 9:33 |
| | ⋮ | ⋮ | ⋮ | ⋮ | ⋮ | ⋮ |
| U0002 | ⋮ | ⋮ | ⋮ | ⋮ | ⋮ | ⋮ |
| ⋮ | ⋮ | ⋮ | ⋮ | ⋮ | ⋮ | ⋮ |

DEFAULT INFORMATION DATABASE

| SERVICE | DEFAULT SETTING ITEM | | | |
|---|---|---|---|---|
| | TRANSMISSION DESTINATION | TRANSMISSION SOURCE | FORMAT | ... |
| SCAN AND MAIL SERVICE | xxx@xxx.com | PERSONAL ADDRESS OF USER | NORMAL COMPRESSION PDF | ... |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

INFORMATION PROCESSING DEVICE FOR DETERMINING WHICH REGISTERED SETTINGS TO USE FOR AN IMAGE FORMING OPERATION

CROSS-REFERENCE TO RELATED APPLICATIONS

This application is based on and claims priority under 35 USC 119 from Japanese Patent Application No. 2020-144943 filed Aug. 28, 2020.

BACKGROUND

(i) Technical Field

The present disclosure relates to an information processing device and a non-transitory computer readable medium.

(ii) Related Art

JP-A-2014-219880 discloses an image processing apparatus that includes an image processing unit, and a setting information storage unit in which setting information for controlling an operation of the image processing unit is stored in association with user information. The image processing apparatus includes a user authentication unit that performs a user authentication by collating user information received from a mobile terminal device, with the user information stored in the setting information storage unit. The image processing apparatus further includes a communication unit that uploads the setting information and the user information stored in the setting information storage unit to a storage device on a network when the user information is authenticated by the user authentication unit.

SUMMARY

Aspects of non-limiting embodiments of the present disclosure relate to an information processing device and a non-transitory computer readable medium that, when in addition to a first image forming device on which a user is about to use a service, a second image forming device on which the user used the service is present, effectively uses setting items that were applied in using the second image forming device as compared with a case where the setting items applied when the setting items that were applied in using the second image forming device are not selectively used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to: when (i) in addition to a first image forming device on which a user is about to use a service, a second image forming device on which the user used the service is present, the second image forming device being different from the first image forming device and (ii) a server in which basic settings of setting items of the service are registered is present, selectively reflect at least one of (a) setting items of the service registered in the second image forming device or (b) the basic settings of the service registered in the server, in the information processing device according to a predetermined condition.

BRIEF DESCRIPTION OF THE DRAWINGS

Exemplary embodiment(s) of the present disclosure will be described in detail based on the following figures, wherein.

DETAILED DESCRIPTION

Hereinafter, exemplary embodiments of the present disclosure will be described in detail with reference to the accompanying drawings. In an exemplary embodiment, descriptions will be made on a case where the present disclosure is applied to an image forming system in which services are executed by plural image forming devices. In the exemplary embodiment, descriptions will be made on a case where an information processing device of the present disclosure is applied to a mobile terminal.

First Exemplary Embodiment

Figure 1:
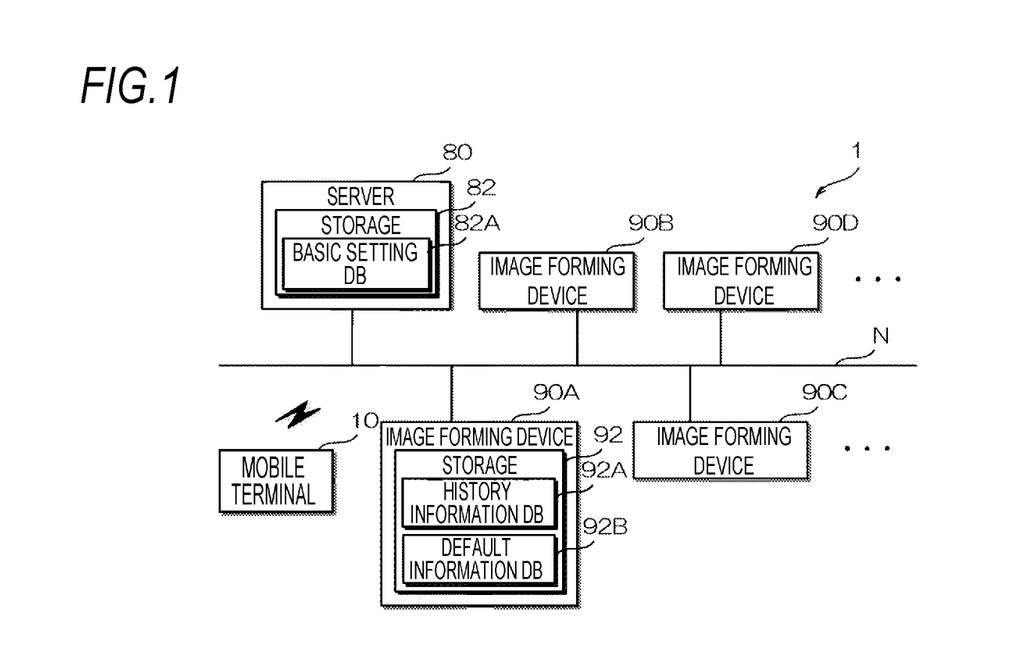
FIG. 1 is a block diagram illustrating an example of the configuration of an image forming system of an exemplary embodiment.

First, the configuration of an image forming system 1 of the exemplary embodiment will be described with reference to FIG. 1. FIG. 1 is a block diagram illustrating an example of the configuration of the image forming system 1 of the exemplary embodiment.

As illustrated in FIG. 1, the image forming system 1 of the exemplary embodiment includes a server 80, and plural image forming devices 90A, 90B, . . . . Hereinafter, when described without distinction, the image forming devices 90A, 90B, . . . will be simply collectively referred to as an "image forming device 90".

Examples of the server 80 may include information processing devices such as a personal computer and a server computer. In the exemplary embodiment, as for the image forming device 90, a digital multifunction machine having an image printing function, an image reading function, an image transmission function, etc., is applied. However, the present disclosure is not limited to this form, in another form, other image forming devices such as an image forming device having only an image printing function, or an image forming device having only an image printing function and an image reading function may be applied as for the image forming device 90.

All the image forming devices 90A, 90B, . . . may not have the same specifications. The image forming devices 90A, 90B, . . . may be different in (i) an executable service, (ii) an item that can be set for the service, or (iii) an equipped option component.

The server 80 and the plural image forming devices 90 are connected to each other via a network N, and the server 80 is able to communicate with each of the image forming devices 90 via the network N. In the exemplary embodiment, as for the network N, a communication line within a company such as a local area network (LAN), or a wide area network (WAN) is applied. It is noted that the present disclosure is not limited to this example. As for the network N, for example, a public communication line such as the Internet, or a telephone line network may be applied, and a combination of the communication line within a company and the public communication line may be applied. In the exemplary embodiment, as for the network N, a wired communication line is applied. It is noted that the present disclosure is not limited to this example. For example, a wireless communication line may be applied, or a combination of wired and wireless communication lines may be applied.

As illustrated in FIG. 1, the server 80 of the exemplary embodiment includes a storage 82, and a basic setting database 82A is stored in the storage 82. The storage 82 is implemented by a hard disk drive (HDD), a solid state drive (SSD), a flash memory or the like.

The image forming device 90 of the exemplary embodiment includes a storage 92, and a history information database 92A and a default information database 92B are stored in the storage 92. The storage 92 is also implemented by an HDD, an SSD, a flash memory or the like. Details of the basic setting database 82A, the history information database 92A, and the default information database 92B will be described later.

Meanwhile, as illustrated in FIG. 1, the image forming system 1 of the exemplary embodiment includes a mobile terminal 10 owned by a user of the image forming system 1. In the exemplary embodiment, as for the mobile terminal 10, a smartphone is applied. It is noted that the present disclosure is not limited thereto. For example, as for the mobile terminal 10, other portable devices such as a mobile phone, a laptop personal computer, and a mobile information terminal device may be applied.

In the exemplary embodiment, descriptions will be made on a case where the mobile terminal 10 corresponding to the information processing device of the present disclosure is configured as a separate configuration from the image forming device 90. It is noted that the present disclosure is not limited thereto. In another example, the information processing device of the present disclosure may be integrally assembled into the image forming device 90.

Figure 2:
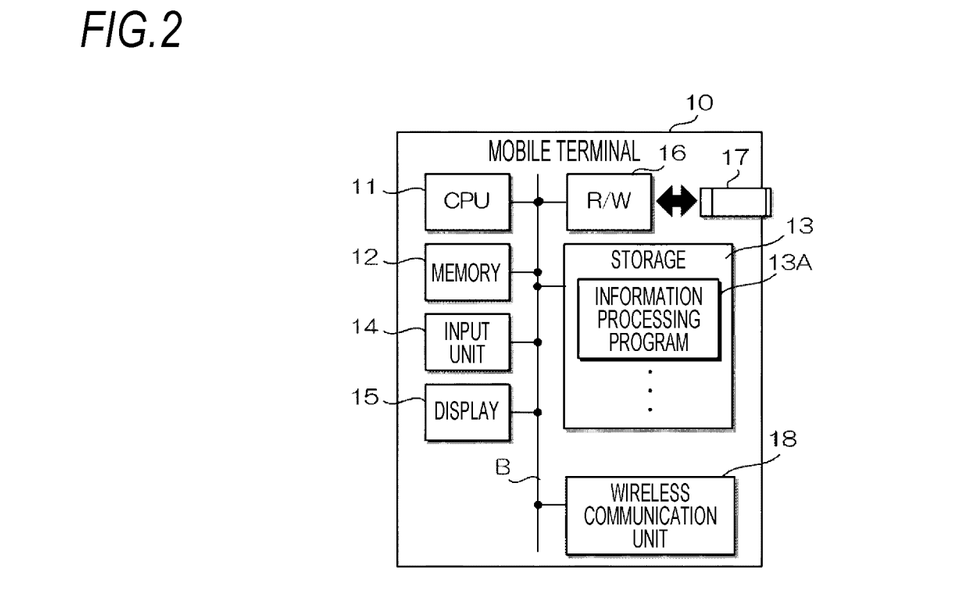
FIG. 2 is a block diagram illustrating an example of a hardware configuration of a mobile terminal of the exemplary embodiment.
Figure 3:
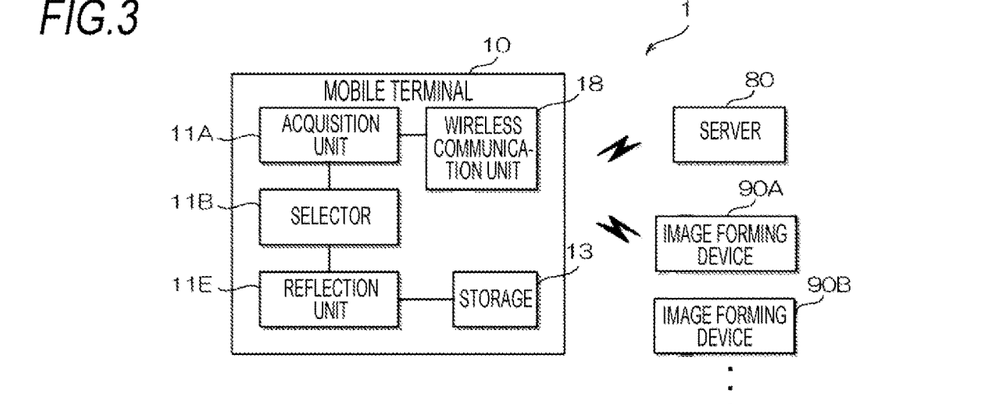
FIG. 3 is a block diagram illustrating an example of a functional configuration of a mobile terminal of a first exemplary embodiment.

Next, the configuration of the mobile terminal 10 of the exemplary embodiment will be described with reference to FIGS. 2 and 3. FIG. 2 is a block diagram illustrating an example of a hardware configuration of the mobile terminal 10 of the exemplary embodiment, and FIG. 3 is a block diagram illustrating an example of a functional configuration of the mobile terminal 10 of the exemplary embodiment.

As illustrated in FIG. 2, the mobile terminal 10 of the exemplary embodiment includes a central processing unit (CPU) 11 serving as a processor, a memory 12 serving as a temporary storage area, a non-volatile storage 13, an input unit 14 such as a touch panel, a display 15 such as a liquid crystal display, a medium reading/writing device (R/W) 16, and a wireless communication unit 18. The CPU 11, the memory 12, the storage 13, the input unit 14, the display 15, the medium reading/writing device 16, and the wireless communication unit 18 are connected to each other via a bus B. The medium reading/writing device 16 reads information written on a recording medium 17 and writes information on the recording medium 17.

The storage 13 of the exemplary embodiment is implemented by an HDD, an SSD, a flash memory or the like. The storage 13 serving as a storage medium stores an information processing program 13A. The information processing program 13A is stored in the storage 13 when the recording medium 17 on which the information processing program 13A is written is connected to the medium reading/writing device 16, and the medium reading/writing device 16 reads the information processing program 13A from the recording medium 17. The CPU 11 reads the information processing program 13A from the storage 13, loads the information processing program 13A on the memory 12, and sequentially executes processes included in the information processing program 13A.

The wireless communication unit 18 of the exemplary embodiment wirelessly communicates with the server 80 and the image forming device 90. Therefore, although not illustrated, a wireless communication unit capable of wirelessly communicating with the wireless communication unit 18 of the mobile terminal 10 is embedded in each of the server 80 and the image forming device 90. In the wireless communication unit 18 of the exemplary embodiment, a WiFi (registered trademark) standard is applied as a communication standard. It is noted that the present disclosure is not limited thereto. For example, in addition to the WiFi standard, any communication standard such as a Bluetooth (registered trademark) standard, or a near field communication (NFC) standard may be applied as a communication standard for the wireless communication unit 18 as long as the communication standard enables a wireless communication with the server 80 and the image forming device 90. The communication between (i) the mobile terminal 10, and (ii) the server 80 and the image forming device 90 is not limited to a wireless communication. In another example, a wired communication may be applied, and a combination of wireless communication and wired communication may be applied.

It is needless to say that although not illustrated, other components for implementing functions for a smartphone, such as a mobile communication unit that communicates with a telephone line network, and a microphone that collects voice uttered by a speaker are provided in the mobile terminal 10.

Next, a functional configuration of the mobile terminal 10 of the exemplary embodiment will be described with reference to FIG. 3. As illustrated in FIG. 3, the mobile terminal 10 includes an acquisition unit 11A, a selector 11B, and a reflection unit 11E. When executing the information processing program 13A, the CPU 11 of the mobile terminal 10 functions as the acquisition unit 11A, the selector 11B, and the reflection unit 11E.

Hereinafter, a situation where in addition to the image forming device 90 on which the user is about to use a service (hereinafter, referred to as a "first image forming device"), another image forming device 90 on which the user used the service (hereinafter, referred to as a "second image forming device") is present is referred to as a "first situation". Hereinafter, a situation where the server 80 in which basic settings of setting items of the service are registered is present is referred to as a "second situation". Further, the "service" mentioned herein also includes a service performed at a cost as well as a service performed free of charge.

In the case of the first situation and the second situation, the acquisition unit 11A of the exemplary embodiment acquires setting items of the service, which are registered in the second image forming device, and basic settings of the service, which are registered in the server 80. The acquisition unit 11A of the exemplary embodiment acquires the setting items and the basic settings of the service by a wireless communication with the server 80 and the second image forming device through the wireless communication unit 18.

Then, the reflection unit 11E of the exemplary embodiment selectively reflects at least one of the setting items or the basic settings acquired by the acquisition unit 11A, in the own device, according to a predetermined condition.

When (i) plural second image forming devices are present and (ii) the setting items registered in the second image forming devices are to be reflected in the own device, the selector 11B of the exemplary embodiment selects the setting items to be reflected in the own device according to a predetermined selection criteria. In particular, in the exemplary embodiment, the predetermined selection criteria is a criteria that the user used most recently.

When (i) some specifications regarding the service are different between the first image forming device and the second image forming device and (ii) the setting items registered in the second image forming device are to be reflected in the own device, the reflection unit 11E of the exemplary embodiment reflects the setting items in the own device in a predetermined state. In particular, in the exemplary embodiment, the predetermined state is set as a state where setting items affected by the different specifications are matched with specifications of the first image forming device. In the exemplary embodiment, the predetermined state is set as a state where only setting items not affected by a difference in the specifications are extracted.

When a predetermined condition is satisfied, the reflection unit 11E of the exemplary embodiment reflects the basic settings registered in the server 80, in the own device. In particular, in the exemplary embodiment, the predetermined condition is set as a condition that contents of setting items that do not exist in the second image forming device but exist in the first image forming device are included in the basic settings. Further, in the exemplary embodiment, the predetermined condition is set as a condition that the date and time of use when the user last used the service on the second image forming device is earlier than the update date and time of the basic settings in the server 80.

When the date and time of use when the user last used the service on the second image forming device is later than the update date and time of the basic settings in the server 80, the reflection unit 11E of the exemplary embodiment reflects the setting items regarding the service, which are registered in the second image forming device, in the own device.

When (i) the setting items registered in the second image forming device are to be reflected in the own device and (ii) the setting items have missing contents, the reflection unit 11E of the exemplary embodiment supplements the missing contents with predetermined contents for reflection in the own device. In particular, in the exemplary embodiment, as for the predetermined contents, corresponding contents among the basic settings registered in the server 80 are applied. In the exemplary embodiment, as for the predetermined contents, default contents are applied.

Figure 4:
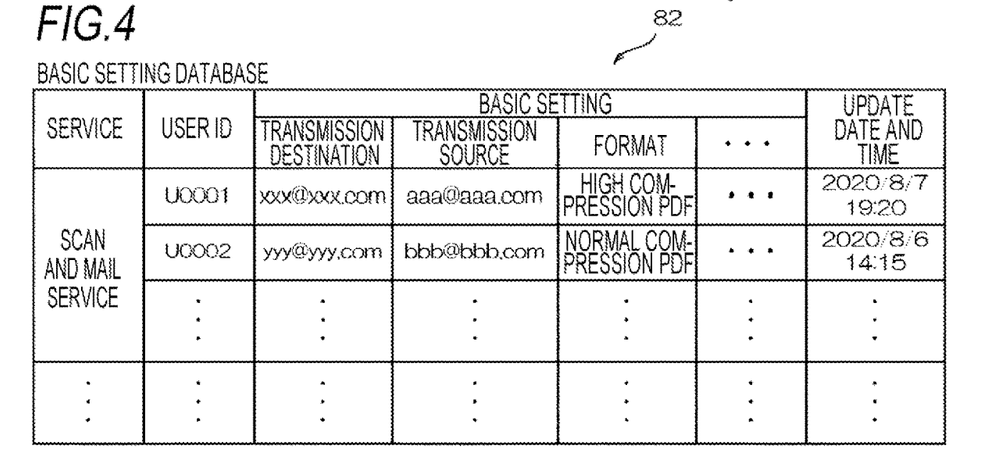
FIG. 4 is a schematic view illustrating an example of the configuration of a basic setting database of the exemplary embodiment.

Next, the basic setting database 82A of the exemplary embodiment will be described with reference to FIG. 4. FIG. 4 is a schematic view illustrating an example of the configuration of the basic setting database 82A of the exemplary embodiment.

The basic setting database 82A of the exemplary embodiment is a collection of basic settings of setting items of services provided by the image forming device 90, and as an example, as illustrated in FIG. 4, information pieces such as a service, a user ID (Identification), basic settings, and an update date and time are stored in association with each other.

The service is information indicating the type of a service, and in the exemplary embodiment, information indicating a service name is applied. The user ID is given in advance as information different for each user in order to individually identify the users of the image forming system 1. The example illustrated in FIG. 4 includes a "scan and mail service" that is example of the service. This service is a service in which an image of a document placed on a predetermined location is read by using an image reading function of the image forming device 90, and the read image is transmitted to a predetermined transmission destination by using an image transmission function. The service includes not only the "scan and mail service", but also various services such as a "scan and transmission-to-PC service" in which an image read by an image reading function is transmitted to a preset personal computer by using an image transmission function.

The basic settings are information indicating contents of basic settings to be selectively applied when the corresponding user executes the corresponding service. In the example illustrated in FIG. 4, the settings that correspond to the "scan and mail service" include "transmission destination" indicating a transmission destination of a read image, "transmission source" indicating a transmission source of the image, "format" that indicates a specification when the image is read, and the like. For other services, contents of basic settings to be applied when the services are executed are stored as the basic settings. Further, in the exemplary embodiment, it is assumed that the contents of the basic settings are set or updated by the corresponding user, or an administrator of the server 80 as necessary. It is noted that the present disclosure is not limited thereto. For example, the contents of the setting items set when each user executes various services for the image forming device 90 included in the image forming system 1 may be sequentially stored for each user, and the most frequently set contents may be automatically applied as the contents of the basic settings.

In this manner, in the image forming system 1 of the exemplary embodiment, it is assumed that the contents of the basic settings in the basic setting database 82A are updated by the corresponding user or the administrator of the server 80 as necessary. The update date and time is information indicating a date and time when the contents of the basic settings of the corresponding service were updated. For example, the example illustrated in FIG. 4 indicates that the contents of the basic settings of the "scan and mail service" for the user given "U0001" as a user ID were updated at 19:20 on Aug. 7, 2020.

Figure 5:
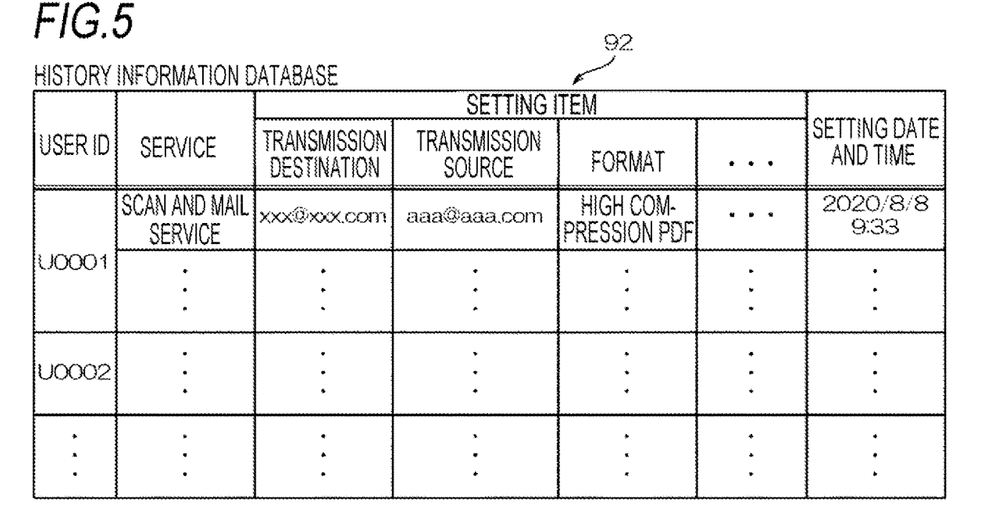
FIG. 5 is a schematic view illustrating an example of the configuration of a history information database of the exemplary embodiment.

Next, the history information database 92A of the exemplary embodiment will be described with reference to FIG. 5. FIG. 5 is a schematic view illustrating an example of the configuration of the history information database 92A of the exemplary embodiment.

The history information database 92A of the exemplary embodiment is a history collection of setting item contents set by each user, for services provided by the image forming device 90 in which the history information database 92A is stored, and as an example, as illustrated in FIG. 5, information pieces such as a user ID, a service, setting items, and a setting date and time are stored in association with each other.

The user ID and the service are the same information pieces as the user ID and the service in the basic setting database 82A, respectively. The setting items are information indicating contents of setting items set by a corresponding user when the corresponding service was executed by the corresponding user. The setting date and time is information indicating a date and time when the corresponding setting items have most recently been set. For example, the example illustrated in FIG. 5 shows that when the user given "U0001" as a user ID executed the "scan and mail service", the contents of the setting item related to the service was set at 09:33 on Aug. 8, 2020.

Figure 6:
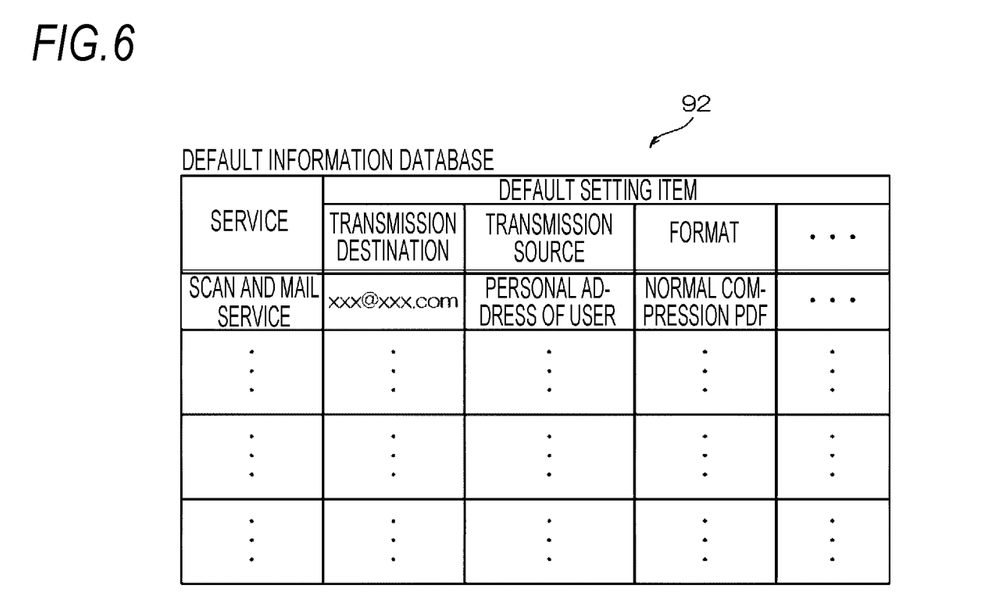
FIG. 6 is a schematic view illustrating an example of the configuration of a default information database of the exemplary embodiment.

Next, the default information database 92B of the exemplary embodiment will be described with reference to FIG. 6. FIG. 6 is a schematic view illustrating an example of the configuration of the default information database 92B of the exemplary embodiment.

The default information database 92B of the exemplary embodiment is a collection of default setting item contents for each service, which may be applied when the services provided by the image forming device 90 in which the default information database 92B is stored are executed. As an example, as illustrated in FIG. 6, information pieces such as a service and default setting items are stored in association with each other.

The service is the same information as the service in the basic setting database 82A, and the default setting items are information indicating default setting item contents for each service, which may be applied when the corresponding service is executed. In the exemplary embodiment, it is assumed that the contents of the default setting items are set or updated by the administrator of the server 80 as necessary.

As described above, it may not be said that all the image forming devices 90A, 90B, . . . of the exemplary embodiment have the same specifications. Therefore, it is assumed that the contents of the setting items stored in the history information database 92A, and the default setting items stored in the default information database 92B correspond to the specifications of the image forming devices 90 in which the history information database 92A and the default information database 92B are stored, respectively.

Figure 7:
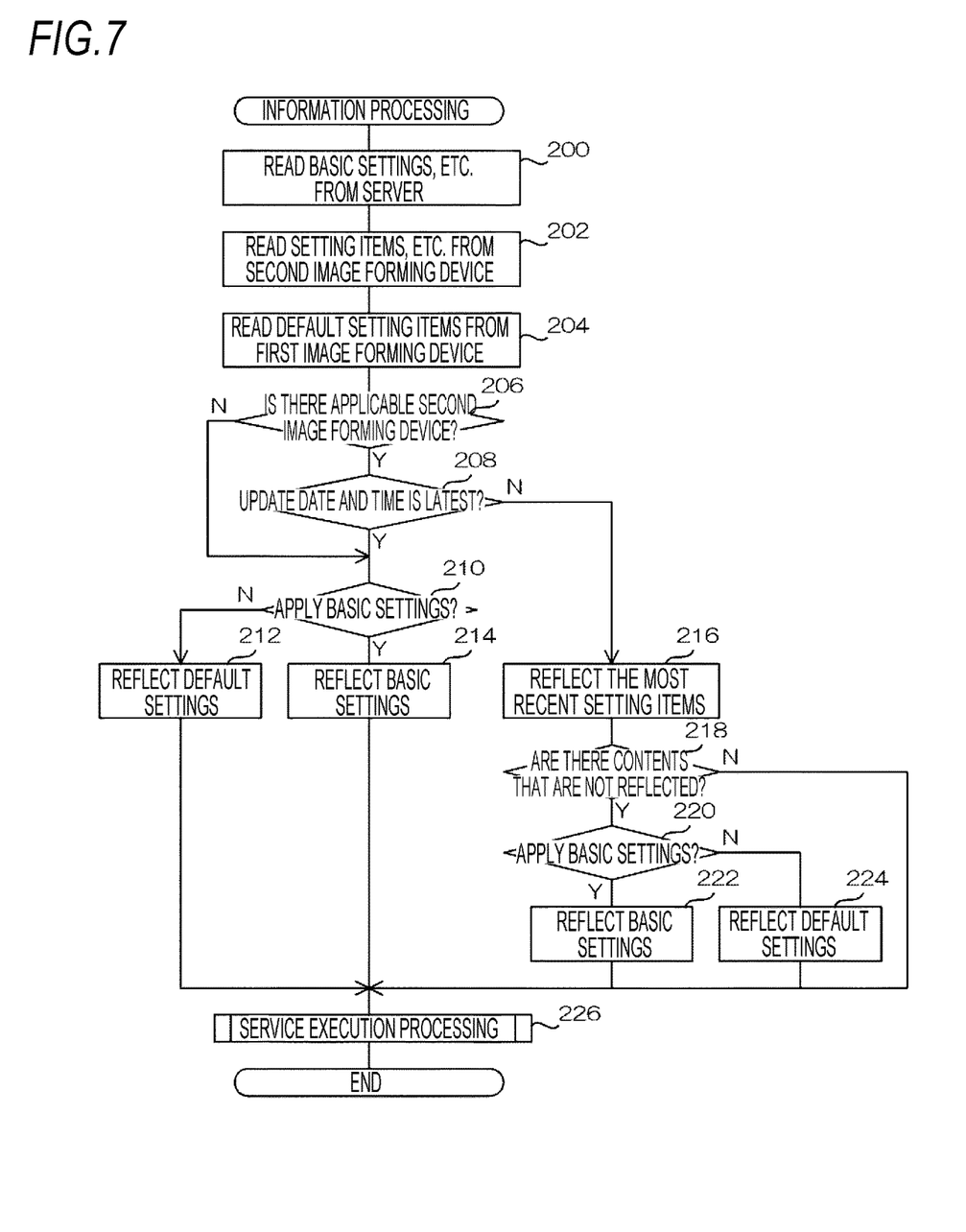
FIG. 7 is a flowchart of an example of information processing of the first exemplary embodiment.

Next, an operation of the mobile terminal 10 of the exemplary embodiment will be described with reference to FIG. 7. FIG. 7 is a flowchart of an example of an information processing of the exemplary embodiment.

In the image forming system 1 of the exemplary embodiment, when any user (hereinafter, referred to as a "target user") executes a desired service by any of the image forming devices 90 (corresponding to the first image forming device), the target user who possesses the mobile terminal 10 approaches the first image forming device. Accordingly, a wireless communication is performed between the mobile terminal 10 and the first image forming device via the wireless communication unit 18, and then, an authentication of the target user is executed and the authentication is established so that services provided by the first image forming device become available. After this authentication is established, when the target user makes an instruction to execute a desired service (hereinafter, referred to as a "target service"), the CPU 11 of the mobile terminal 10 executes the information processing program 13A, thereby executing the information processing illustrated in FIG. 7. Here, in order to avoid a complexity, descriptions will be made on a case where the basic setting database 82A, the history information database 92A, and the default information database 92B have already been constructed. Here, in order to avoid a complexity, descriptions will be made on a case where a communication between the mobile terminal 10 and the server 80 is always available, and there are plural image forming devices 90 (corresponding to the above described second image forming devices) on which the target service was used by the target user in the past, in addition to the first image forming device.

In step 200 in FIG. 7, the CPU 11 reads information pieces such as basic settings and an update date and time, which correspond to the target service, and correspond to the target user, from the basic setting database 82A of the server 80. In step 202, the CPU 11 reads information pieces such as setting items and a setting date and time, which correspond to the target user, and correspond to the target service, from the history information database 92A of the second image forming device. In step 204, the CPU 11 reads default setting items corresponding to the target service from the default information database 92B of the first image forming device.

In the exemplary embodiment, all the second image forming devices capable of communicating with the mobile terminal 10 possessed by the target user are set as the second image forming devices as reading targets of information in the processing in step 202. It is noted that the present disclosure is not limited thereto.

For example, among the second image forming devices capable of communicating with the mobile terminal 10 possessed by the target user, second image forming devices whose distances from the mobile terminal 10 are within a predetermined distance may be set as the reading targets of information. For example, second image forming devices corresponding to a predetermined number or less may be set as the reading targets of information in the order of the closest distance from the mobile terminal 10 possessed by the target user. Alternatively, the predetermined distance or the predetermined number may be set in advance as a fixed value, or may be set in advance by the user of the mobile terminal 10. Here, the distance between the mobile terminal 10 and the second image forming device may be specified according to the intensity of radio waves received by the mobile terminal 10 from the second image forming device. Alternatively, an installation location of each of the image forming devices 90 may be registered in advance in the mobile terminal 10, and the distance may be specified from a difference between the installation location and the location of the mobile terminal 10 specified by a global positioning system (GPS) function or the like.

In step 206, the CPU 11 compares the read setting items of the second image forming device, to the default setting items of the first image forming device, and determines whether there are setting items of the second image forming device, which are applicable when the target service is executed by the first image forming device. Then, the CPU 11 proceeds to step 210 to be described later when this determination is a negative determination, and proceeds to step 208 when this determination is an affirmative determination.

Further, in the processing in step 206, the determination as to whether applicable setting items are present is performed by determining whether there is a second image forming device in which the number of contents of the read setting items, which match with the default setting items of the first image forming device, is equal to or greater than a predetermined number. Here, the predetermined number may also be set in advance as a fixed value, or may be set in advance by the user of the mobile terminal 10. Hereinafter, in the processing in step 206, the second image forming device whose setting items become applicable is referred to as an "applicable second image forming device".

In step 208, the CPU 11 determines whether the update date and time read from the server 80 is the latest through comparison with the setting date and time read from the applicable second image forming device, and proceeds to step 210 when an affirmative determination is made.

In step 210, the CPU 11 determines whether to apply the basic settings read from the server 80, and proceeds to step 212 when a negative determination is made. In step 212, the CPU 11 reflects the default setting items read from the first image forming device, in the setting items to be applied when the target service is executed, and then proceeds to step 226. When an affirmative determination is made in the processing in step 210, the CPU 11 proceeds to step 214 and reflects the basic settings read from the server 80, in the setting items to be applied when the target service is executed, and then proceeds to step 226. In the exemplary embodiment, for the determination as to whether to apply the basic settings in the processing in step 210, the target user is allowed to specify in advance which of the basic settings and the default setting items are to be preferentially applied, and the specified result is used for determination. It is noted that the present disclosure is not limited to this example. For example, between the basic settings and the default setting items, one that is more frequently used by the target user may be automatically applied, or between the basic settings and the default setting items, one containing more applicable contents may be automatically applied.

Meanwhile, when a negative determination is made in the processing in step 208, the CPU 11 proceeds to step 216 and reflects the setting items of the applicable second image forming device on which the target service was most recently used by the target user, in the setting items to be applied when the target service is executed. In step 218, the CPU 11 determines whether the setting items to be applied when the target service is executed have contents that are not reflected in the processing in step 216 (hereinafter, referred to as "missing contents"). Here, the CPU 11 proceeds to step 226 when a negative determination is made, and proceeds to step 220 when an affirmative determination is made.

In step 220, the CPU 11 determines whether to apply the corresponding contents of the basic settings read from the server 80 to the missing contents in the same manner as in the above described processing in step 210, and proceeds to step 222 when an affirmative determination is made. In step 222, the CPU 11 reflects the corresponding contents of the basic settings, in the missing contents of the setting items to be applied when the target service is executed, and then proceeds to step 226. When a negative determination is made in the processing in step 220, the CPU 11 proceeds to step 224 and reflects the corresponding contents of the default setting items, in the missing contents of the setting items to be applied when the target service is executed, and then proceeds to step 226.

In step 226, the CPU 11 executes service execution processing which is processing for causing the first image forming device to execute the target service, and then ends the present information processing. Before executing the service execution processing, the CPU 11 stores the contents of the setting items related to the target service, which are determined through the above processing, as the contents of the setting items corresponding to the target user, and corresponding to the target service, together with a date and time (setting date and time) at this point in time, in the history information database 92A.

Second Exemplary Embodiment

Figure 8:
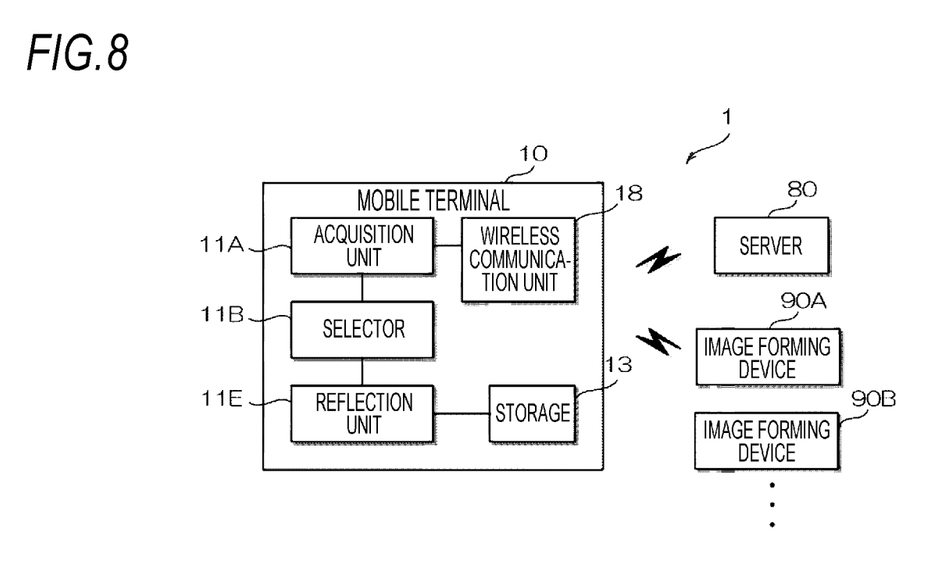
FIG. 8 is a block diagram illustrating an example of a functional configuration of a mobile terminal of a second exemplary embodiment.

The overall configuration of the image forming system 1 of the second exemplary embodiment and the hardware configuration of the mobile terminal 10 are the same as those of the image forming system 1 and the mobile terminal 10 of the first exemplary embodiment. Thus, first, the functional configuration of the mobile terminal 10 of the exemplary embodiment will be described with reference to FIG. 8. FIG. 8 is a block diagram illustrating an example of the functional configuration of the mobile terminal 10 of the exemplary embodiment. In FIG. 8, the same elements as those in FIG. 3 will be denoted by the same reference numerals as those in FIG. 3, and descriptions thereof will be omitted.

As illustrated in FIG. 8, the mobile terminal 10 of the second exemplary embodiment is different from the mobile terminal 10 of the first exemplary embodiment in that a selector 11b is applied instead of the selector 11B.

That is, when (i) plural second image forming devices are present and (ii) the setting items registered in the second image forming device are to be reflected in the own device, the selector 11b of the exemplary embodiment selects the setting items most frequently used by the user, as the setting items to be reflected in the own device.

Figure 9:
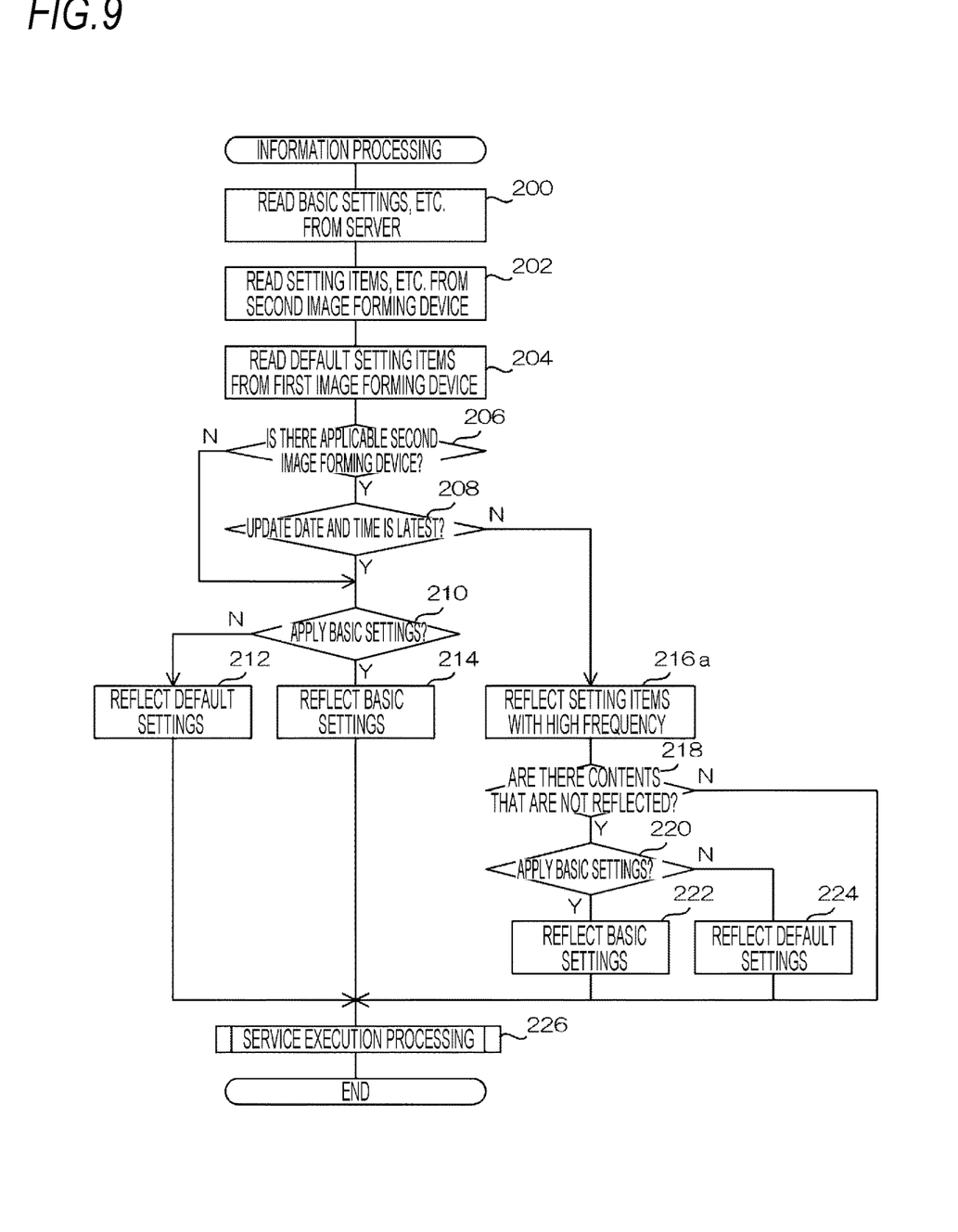
FIG. 9 is a flowchart of an example of information processing of the second exemplary embodiment.

Next, an operation of the mobile terminal 10 of the exemplary embodiment will be described with reference to FIG. 9. FIG. 9 is a flowchart of an example of information processing of the exemplary embodiment. In FIG. 9, steps for performing the same processing as that in FIG. 7 will be denoted by the same step numbers as those in FIG. 7, and descriptions thereof will be omitted.

As illustrated in FIG. 9, the information processing of the exemplary embodiment is different from the information processing of the first exemplary embodiment in that the processing in step 216a is applied instead of the processing in step 216.

That is, in step 216a, the CPU 11 reflects setting items of a second image forming device most frequently used by the target user, among applicable second image forming devices, in setting items to be applied when the target service is executed. In the exemplary embodiment, the second image forming device most frequently used by the target user is specified as follows. In the exemplary embodiment, for the specifying, each image forming device 90 stores user IDs of users who are authenticated in using the image forming device 90, and then, the second image forming device in which the number of times of storing of the same user ID as that of the target user authenticated in using the target service at this time is largest is specified. Meanwhile, the present disclosure is not limited to this example. For example, for the above specifying, the numbers of times of authentication of user IDs may be stored instead of the user IDs, and then the second image forming device in which the number of times of authentication of the same user ID as that of the target user authenticated in using the target service at this time is largest may be specified.

In this manner, in the exemplary embodiment, descriptions have been made on the case where the setting items of the second image forming device most frequently used by the target user, among the applicable second image forming devices, are reflected in the setting items to be applied when the target service is executed. It is noted that the present disclosure is not limited thereto. For example, setting items most frequently used by the target user in the applicable second image forming devices may be reflected in the setting items to be applied when the target service is executed. Specifically, in this case, the usage frequencies of setting items may be sequentially counted for each user in each image forming device 90, and the setting items most frequently used may be reflected.

Third Exemplary Embodiment

Figure 10:
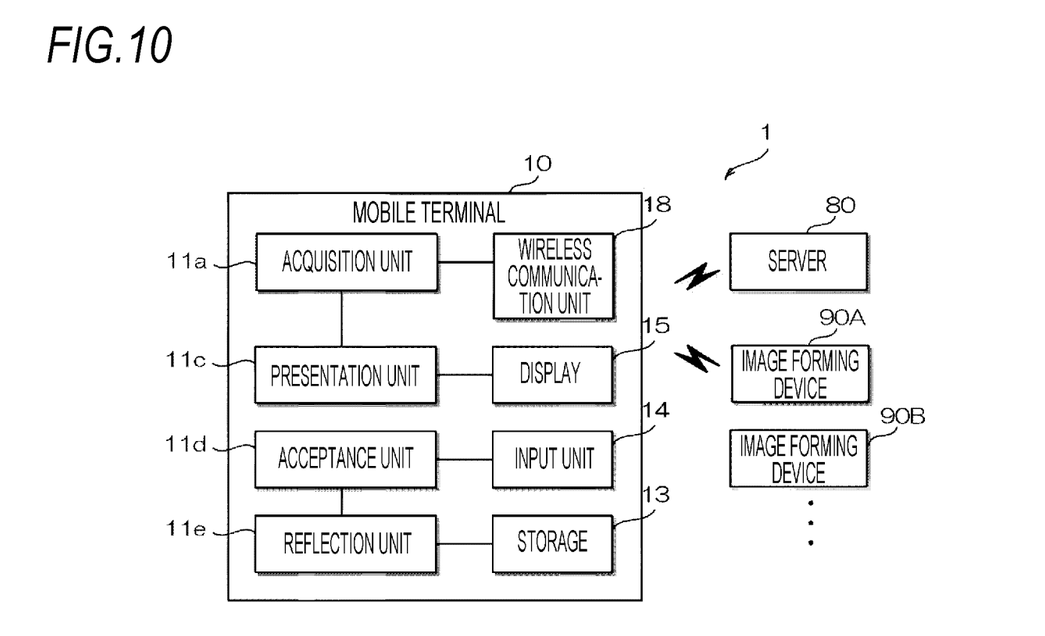
FIG. 10 is a block diagram illustrating an example of a functional configuration of a mobile terminal of a third exemplary embodiment.

The overall configuration of the image forming system 1 of the third exemplary embodiment and the hardware configuration of the mobile terminal 10 are the same as those of the image forming system 1 and the mobile terminal 10 of the first exemplary embodiment. Thus, first, the functional configuration of the mobile terminal 10 of the exemplary embodiment will be described with reference to FIG. 10. FIG. 10 is a block diagram illustrating an example of the functional configuration of the mobile terminal 10 of the exemplary embodiment. In FIG. 10, the same elements as those in FIG. 3 will be denoted by the same reference numerals as those in FIG. 3, and descriptions thereof will be omitted.

As illustrated in FIG. 10, the mobile terminal 10 of the third exemplary embodiment is different from the mobile terminal 10 of the first exemplary embodiment in that an acquisition unit 11*a* is applied instead of the acquisition unit 11A. Also, the mobile terminal 10 of the third exemplary embodiment is different from the mobile terminal 10 of the first exemplary embodiment in that the selector 11B is deleted, a presentation unit 11*c* and an acceptance unit 11*d* are added, and a reflection unit 11*e* is applied instead of the reflection unit 11E.

When plural second image forming devices are present, the acquisition unit 11*a* of the exemplary embodiment acquires setting items from the plural second image forming devices. The presentation unit 11*c* of the exemplary embodiment presents the plural setting items acquired by the acquisition unit 11*a*. The acceptance unit 11*d* of the exemplary embodiment accepts selective designation of setting items to be applied, from the plural setting items which are acquired by the acquisition unit 11*a*, and presented by the presentation unit 11*c*. Then, the reflection unit 11*e* of the exemplary embodiment reflects the setting items in the own device according to the selective designation accepted by the acceptance unit 11*d*. In the exemplary embodiment, as for presentation by the presentation unit 11*c*, presentation by displaying by the display 15 of the mobile terminal 10 is applied. It is noted that the present disclosure is not limited thereto. For example, as for the presentation by the presentation unit 11*c*, presentation by voice by a voice generation device such as a speaker may be applied.

The presentation unit 11*c* of the exemplary embodiment further presents setting items not affected by the above described difference in the specifications.

Figure 11:
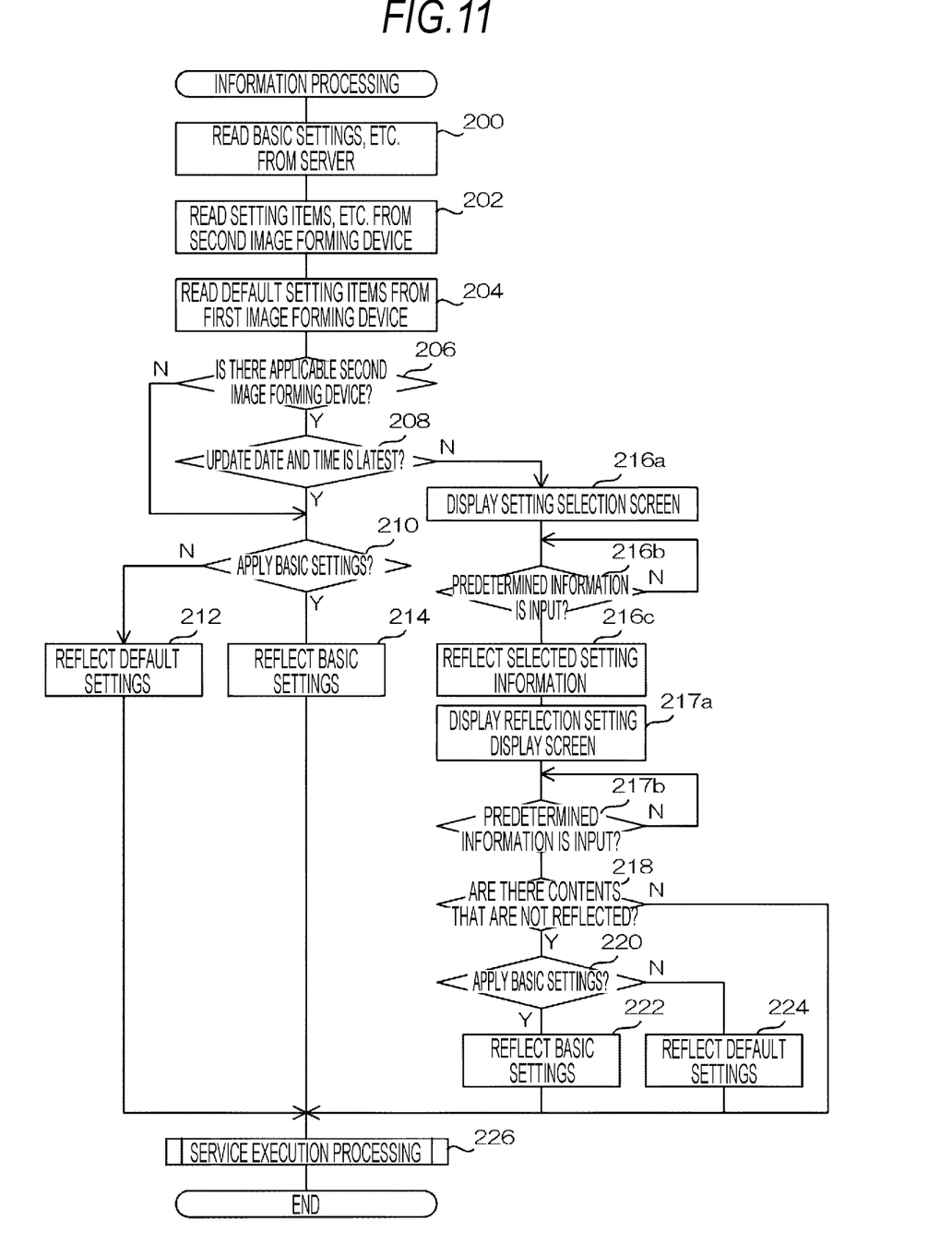
FIG. 11 is a flowchart of an example of information processing of the third exemplary embodiment.
Figure 12:
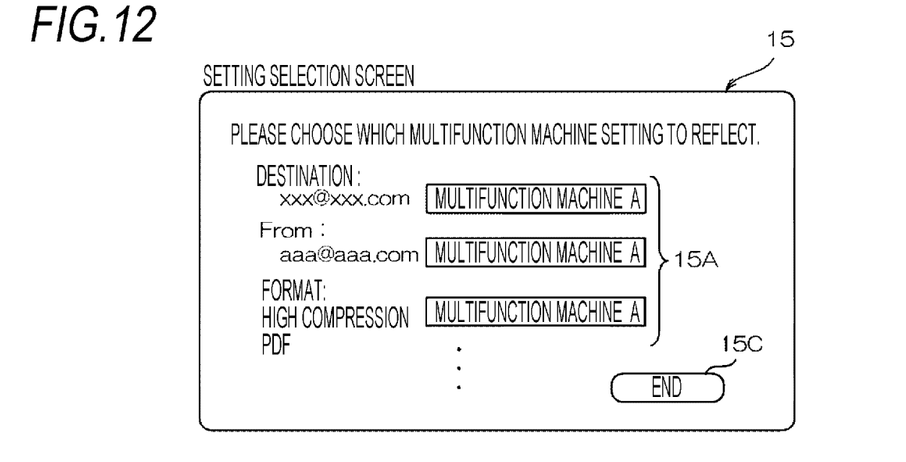
FIG. 12 is a front view illustrating an example of a setting selection screen of the third exemplary embodiment.
Figure 13:
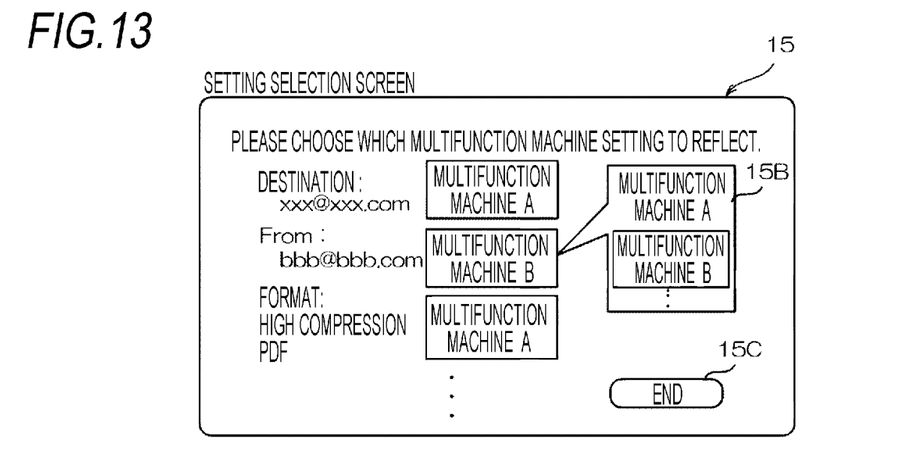
FIG. 13 is a front view illustrating an example of the setting selection screen of the third exemplary embodiment.
Figure 14:
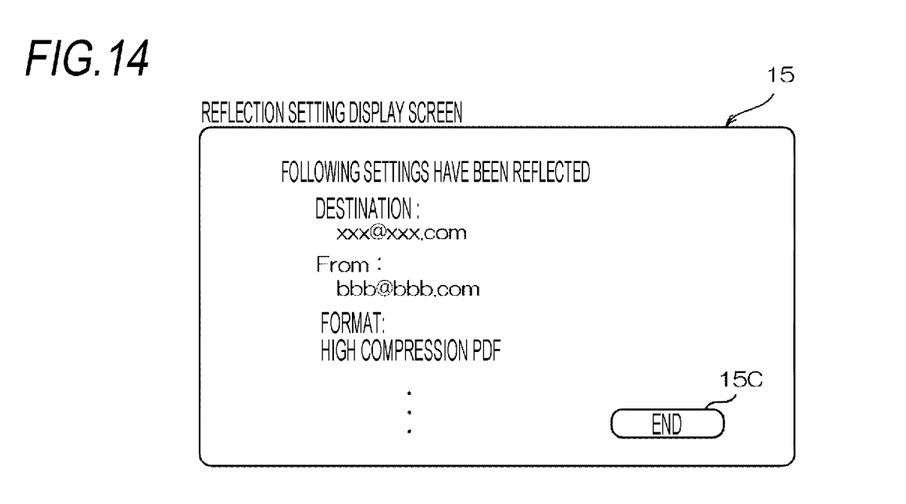
FIG. 14 is a front view illustrating an example of a reflection setting display screen of the third exemplary embodiment.

Next, an operation of the mobile terminal 10 of the exemplary embodiment will be described with reference to FIGS. 11 to 14. FIG. 11 is a flowchart of an example of information processing of the exemplary embodiment, and FIG. 12 is a front view illustrating an example of a setting selection screen of the exemplary embodiment. FIG. 13 is a front view illustrating an example of the setting selection screen of the exemplary embodiment, and FIG. 14 is a front view illustrating an example of a reflection setting display screen of the exemplary embodiment. Further, in FIG. 11, steps for performing the same processing as that in FIG. 7 will be denoted by the same step numbers as those in FIG. 7, and descriptions thereof will be omitted.

As illustrated in FIG. 11, the information processing of the exemplary embodiment is different from the information processing of the first exemplary embodiment in that processing in step 216*a* to step 216*c* are applied instead of the processing in step 216, and processing in step 217*a* and step 217*b* are added.

That is, in step 216*a*, the CPU 11 controls the display 15 to display a setting selection screen having a predetermined configuration by using setting items read from applicable second image forming devices. In step 216*b*, the CPU 11 waits until predetermined information is input.

As illustrated in FIG. 12, on the setting selection screen of the exemplary embodiment, an urging message for selection of the image forming device 90, as a reflection source of a setting item, is displayed. On the setting selection screen of the exemplary embodiment, contents of setting items read from any one of applicable second image forming devices are displayed as candidates for contents of setting items to be applied when the target service is executed. On the setting selection screen of the exemplary embodiment, a selection button 15A that displays information indicating the image forming device 90 from which the contents of the displayed setting item are read is displayed. Further, in the exemplary embodiment, on the setting selection screen, as for the second image forming device as a candidate display target for setting item contents, a second image forming device corresponding to a setting item in which the number of contents matching with the default setting item of the first image forming device is largest is applied. It is needless to say that the present disclosure is not limited thereto.

As an example, when the setting selection screen illustrated in FIG. 12 is displayed on the display 15, if there is no problem in the displayed contents of the setting items, the target user selects an end button 15C displayed in the lower end portion of the setting selection screen, via the input unit 14. If there is a problem in the displayed contents on the setting selection screen, the target user selects the selection button 15A corresponding to the problematic contents, via the input unit 14.

When any of the selection buttons 15A is selected by the target user, as illustrated in FIG. 13, as an example, the CPU 11 displays selection information 15B indicating applicable second image forming devices from which the setting item including the corresponding contents is read, in regard to the selected selection button 15A. When the selection information 15B is displayed on the setting selection screen, the target user selects a display region of the applicable second image forming device to be applied, via the input unit 14. According to this selection, the CPU 11 replaces the contents of the corresponding setting item on the setting selection screen, with the corresponding contents of the setting item read from the applicable second image forming device selected by the target user, and displays the contents. Then, when there is no problem in the contents of all setting items displayed on the setting selection screen, the target user selects the end button 15C via the input unit 14. When the end button 15C is selected by the target user, an affirmative determination is made in step 216b and the process proceeds to step 216c.

In step 216c, the CPU 11 reflects the contents of the setting items finally displayed on the setting selection screen, in setting items to be applied when the target service is executed.

In step 217a, the CPU 11 controls the display 15 to display a reflection setting display screen having a predetermined configuration by using the contents of the setting items finally displayed on the setting selection screen. In step 217b, the CPU 11 waits until predetermined information is input.

As illustrated in FIG. 14, on the reflection setting display screen of the exemplary embodiment, the contents of the setting items reflected by the processing in step 216c, that is, the contents of the setting items not affected by the above described difference in the specifications, are displayed. Therefore, the target user may grasp the contents of the setting items not affected by the difference in the specifications by referring to the reflection setting display screen.

As an example, when the reflection setting display screen illustrated in FIG. 14 is displayed on the display 15, the target user confirms the displayed contents, and then selects the end button 15C displayed in the lower end portion of the reflection setting display screen via the input unit 14. Accordingly, an affirmative determination is made in step 217b, and the process proceeds to step 218.

In the exemplary embodiment, descriptions have been made on a case where the setting items acquired from the applicable second image forming devices are presented, and the user is allowed to correct the contents as necessary and to reflect the contents. It is noted that the present disclosure is not limited thereto. For example, basic settings acquired from the server 80 and default setting items acquired from the first image forming device may be presented, and the user may be allowed to correct the contents as necessary and to reflect the contents.

In each of the above exemplary embodiments, descriptions have been made on a case where a communication between the mobile terminal 10 and the server 80 is always available. It is noted that the present disclosure is not limited thereto. For example, when a communication between the mobile terminal 10 and the server 80 is not available, setting items stored in any of applicable second image forming devices may be reflected in setting items to be applied when the target service is executed. In this case, default setting items stored in the first image forming device may be reflected in setting items to be applied when the target service is executed.

In each of the above exemplary embodiments, descriptions have been made on a case where there are plural second image forming devices on which the target service was used by the user in the past. It is noted that the present disclosure is not limited thereto. For example, when there is only one second image forming device on which the target service was used by the user in the past, the information processing of each of the above exemplary embodiments may be executed for only setting items of the second image forming device.

In each of the above exemplary embodiments, there is no mention of a case where the application of setting items set in the image forming device 90, to the other image forming devices 90 is prohibited. In such a case, basic settings may be always applied.

In each of the exemplary embodiments described above, there is no mention of a case where the user makes a setting such that basic settings registered in the server 80 are always used. In such a case, the basic settings may also be always applied.

In each of the exemplary embodiments described above, descriptions have been made on the cases where all information such as basic settings, setting items, and default setting items are acquired, and information required for reflection is selected and reflected in the own device. It is noted that the present disclosure is not limited thereto. For example, in another exemplary embodiment, information to be reflected in the own device may be specified, and then, only the specified information may be acquired and reflected in the own device.

While the exemplary embodiments have been described, the technical scope of the present invention is not limited to the scope described in the exemplary embodiments. Various changes or improvements may be made in the exemplary embodiments within the scope that does not depart from the gist of the invention. The changed or modified embodiments are also included in the technical scope of the present invention.

The above-described exemplary embodiments do not limit claims. All combinations of the features described in the exemplary embodiments are not necessarily essential for implementing the objective sought to be achieved by the present invention. The above-described exemplary embodiments include inventions at various stages, and various inventions are extracted by combining plural disclosed constituent requirements. Even if some constituent requirements are deleted from all constituent requirements illustrated in the exemplary embodiments, a configuration in which some constituent requirements are deleted may be extracted as the invention as long as the effect may be obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiments, descriptions have been made on a case where as for the information processing device, a portable device is applied. It is noted that the present disclosure is not limited thereto. It is needless to say that a non-portable device such as a stationary personal computer or a smart speaker may be applied as for the information processing device.

In the above exemplary embodiments, descriptions have been made on a case where the information processing is implemented through a software configuration by using a computer when a program is executed. It is noted that the present disclosure is not limited thereto. For example, the information processing may be implemented by a hardware configuration, or a combination of a hardware configuration and a software configuration.

In addition, the configuration of the mobile terminal 10 described in the above exemplary embodiments is an example, and it is needless to say that unnecessary parts may be deleted or new parts may be added within a range that does not deviate from the gist of the present invention.

The flow of the information processing described in the above exemplary embodiments is also an example, and it is needless to say that unnecessary steps may be deleted, new steps may be added, or the processing order may be changed within the scope that does not depart from the gist of the present invention.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
   a processor configured to:
   when (i) in addition to a first image forming device on which a user is about to use a service, a second image forming device on which the user used the service is present, the second image forming device being different from the first image forming device and (ii) a server in which basic settings of setting items of the service are registered is present:
      read at least one of basic settings of the service registered in the server and setting items of the service registered in the second image forming device;
      read default setting items from the first image forming device;
      determine which of the basic settings of the service registered in the server or setting items of the service registered in the second image forming device to reflect in the information processing apparatus, the determination being based upon whether an applicable second image forming device is present and, if so, whether an update date and time of when the user last used the service on the applicable second image forming device is earlier than an update date and time of the basic settings in the server;
      when the update date and time when the user last used the service on the applicable second image forming device is determined to be the same or earlier than the update date and time of the basic settings in the server, reflect the basic settings of the service registered in the server, into the first image forming device; and
      when the update date and time when the user last used the service on the applicable second image forming device is determined to be later than the update date and time of the basic settings in the server, reflect the setting items of the service registered in the second image forming device into the first image forming device.

2. The information processing device according to claim 1, wherein
   the processor is configured to, when (i) a plurality of the second image forming devices are present and (ii) the setting items registered in the second image forming devices are to be reflected in the information processing device, select the setting items to be reflected in the information processing device according to a predetermined selection criteria.

3. The information processing device according to claim 2, wherein
   the processor is configured to, when the plurality of second image forming devices are present,
      acquire the setting items from the plurality of second image forming devices,
      accept selective designation of setting items to be applied from the plurality of acquired setting items, and
      reflect the setting items in the information processing device according to the accepted selective designation.

4. The information processing device according to claim 2, wherein the predetermined selection criteria is a criteria that the user used most recently.

5. The information processing device according to claim 2, wherein the predetermined selection criteria is a criteria that a usage frequency by the user is highest.

6. The information processing device according to claim 4, wherein
   the processor is configured to, when the plurality of second image forming devices are present,
      acquire the setting items from the plurality of second image forming devices,
      accept selective designation of setting items to be applied from the plurality of acquired setting items, and
      reflect the setting items in the information processing device according to the accepted selective designation.

7. The information processing device according to claim 5, wherein
   the processor is configured to, when the plurality of second image forming devices are present,
      acquire the setting items from the plurality of second image forming devices,
      accept selective designation of setting items to be applied from the plurality of acquired setting items, and
      reflect the setting items in the information processing device according to the accepted selective designation.

8. The information processing device according to claim 1, wherein
   the processor is configured to, when a plurality of the second image forming devices are present,
      acquire the setting items from the plurality of second image forming devices,
      accept selective designation of setting items to be applied from the plurality of acquired setting items, and
      reflect the setting items in the information processing device according to the accepted selective designation.

9. The information processing device according to claim 1, wherein the processor is configured to, when (i) a part of specifications regarding the service are different between the first image forming device and the second image forming device and the setting items registered in the second image forming device are to be reflected in the information processing device, reflect the setting items in the information processing device in a predetermined state.

10. The information processing device according to claim 9, wherein the predetermined state is a state where setting items affected by the different specifications are matched with specifications of the first image forming device.

11. The information processing device according to claim 10, wherein the predetermined state is a state where only setting items not affected by a difference in the specifications are extracted.

12. The information processing device according to claim 11, wherein the processor is configured to present the setting items not affected by the difference in the specifications.

13. The information processing device according to claim 1, wherein
the processor is configured to, when a date and time of use when the user last used the service on the second image forming device is later than an update date and time of the basic settings in the server, reflect the setting items regarding the service, which are registered in the second image forming device, in the information processing device.

14. The information processing device according to claim 1, wherein
the processor is configured to, when (i) the setting items registered in the second image forming device are to be reflected in the information processing device and (ii) the setting items have missing contents, supplement the missing contents with predetermined contents for reflection in the information processing device.

15. The information processing device according to claim 14, wherein the processor is configured to apply corresponding contents among the basic settings registered in the server, as the predetermined contents.

16. The information processing device according to claim 14, wherein the processor is configured to apply default contents as the predetermined contents.

17. A non-transitory computer readable medium storing a program that causes a computer to execute information processing, the information processing comprising:
when (i) in addition to a first image forming device on which a user is about to use a service, a second image forming device on which the user used the service is present, the second image forming device being different from the first image forming device and (ii) a server in which basic settings of setting items of the service are registered is present:
reading at least one of basic settings of the service registered in the server and setting items of the service registered in the second image forming device;
reading default setting items from the first image forming device;
determining which of the basic settings of the service registered in the server or setting items of the service registered in the second image forming device to reflect in the information processing apparatus, the determination being based upon whether an applicable second image forming device is present and, if so, whether an update date and time of when the user last used the service on the applicable second image forming device is earlier than an update date and time of the basic settings in the server;
when the update date and time when the user last used the service on the applicable second image forming device is determined to be the same or earlier than the update date and time of the basic settings in the server, reflecting the basic settings of the service registered in the server, into the first image forming device; and
when the update date and time when the user last used the service on the applicable second image forming device is determined to be later than the update date and time of the basic settings in the server, reflecting the setting items of the service registered in the second image forming device into the first image forming device.

* * * * *